(12) United States Patent
Satheesh et al.

(10) Patent No.: US 9,887,530 B2
(45) Date of Patent: Feb. 6, 2018

(54) SELF SUPPLIED PROTECTION RELAY WITH A MODULE TO BOOST PERFORMANCE

(71) Applicant: ABB RESEARCH LTD, Zurich (CH)

(72) Inventors: Hariram Satheesh, Thoothukudi (IN); Bernhard Deck, Weilheim (DE); GN Krishnamoorthy, Tamilnadu (IN); Mallikarjun Kande, Bangalore (IN); Sanjeev Koul, Bangalore (IN); Naman Raval, Gujarat (IN); Nayan Shah, Gujarat (IN); Vishal H. Shah, Gujarat (IN)

(73) Assignee: ABB Schweiz AG, Baden (CH)

( * ) Notice: Subject to any disclaimer, the term of this patent is extended or adjusted under 35 U.S.C. 154(b) by 192 days.

(21) Appl. No.: 14/730,785

(22) Filed: Jun. 4, 2015

(65) Prior Publication Data
US 2015/0270697 A1 Sep. 24, 2015

Related U.S. Application Data

(63) Continuation of application No. PCT/IB2013/001791, filed on Aug. 19, 2013.

(30) Foreign Application Priority Data

Dec. 4, 2012 (IN) .......................... 5044/CHE/2012
Apr. 1, 2013 (IN) .......................... 1464/CHE/2013

(51) Int. Cl.
*H02H 1/00* (2006.01)
*H02H 1/06* (2006.01)
(Continued)

(52) U.S. Cl.
CPC .............. *H02H 1/063* (2013.01); *H02H 3/05* (2013.01); *H02H 3/093* (2013.01); *H02H 3/105* (2013.01)

(58) Field of Classification Search
CPC ........ H02H 1/063; H02H 3/105; H02H 3/093; H02H 3/05
See application file for complete search history.

(56) References Cited

U.S. PATENT DOCUMENTS 4,347,541 A 8/1982 Chen et al.
4,380,785 A 4/1983 Demeyer et al.
(Continued)

FOREIGN PATENT DOCUMENTS

EP 1 589 629 A2 10/2005
EP 2 466 711 A1 6/2012
(Continued)

OTHER PUBLICATIONS

International Search Report (PCT/ISA/210) dated Mar. 3, 2014, by the Indian Patent Office as the International Searching Authority for International Application No. PCT/IB2013/001791.
(Continued)

*Primary Examiner* — Zeev V Kitov
(74) *Attorney, Agent, or Firm* — Barnes & Thornburg LLP (57) ABSTRACT

A protection relay is disclosed that generates a trip signal to operate a circuit breaker in case of a fault condition. A first module provides measurement and analysis of power parameters of the power line connecting the power equipment that is being protected, the protection being provided by generating a first trip signal for operating a circuit breaker connected in the power line. One or more second modules can boost performance of the protection relay by measurement and analysis of power parameters-to generate a second trip signal for operating a circuit breaker connected in the power line. The first trip signal and the second trip signal are logically combined to generate a trip signal that operates the circuit breaker.

11 Claims, 8 Drawing Sheets

(51) Int. Cl.
*H02H 3/05* (2006.01)
*H02H 3/093* (2006.01)
*H02H 3/10* (2006.01)

(56) References Cited

U.S. PATENT DOCUMENTS

| | | | |
|---|---|---|---|
| 4,442,472 A * | 4/1984 | Pang | H02H 3/0935 |
| | | | 361/95 |
| 6,496,342 B1 | 12/2002 | Horvath et al. | |
| 2003/0063422 A1 | 4/2003 | Bilac | |
| 2003/0067725 A1 | 4/2003 | Horvath et al. | |
| 2005/0231875 A1 | 10/2005 | Viaro et al. | |
| 2009/0222773 A1* | 9/2009 | Homma | G06F 17/5036 |
| | | | 716/136 |
| 2012/0154957 A1 | 6/2012 | Williams | |
| 2013/0242441 A1 | 9/2013 | Suthar et al. | |

FOREIGN PATENT DOCUMENTS

| | | |
|---|---|---|
| WO | WO 00/48284 A1 | 8/2000 |
| WO | WO 2009/101463 A1 | 8/2009 |
| WO | WO 2012/056277 A1 | 5/2012 |
| WO | WO 2012/056287 A2 | 5/2012 |

OTHER PUBLICATIONS

Written Opinion (PCT/ISA/237) dated Mar. 3, 2014, by the Indian Patent Office as the International Searching Authority for International Application No. PCT/IB2013/001791.

* cited by examiner

SELF SUPPLIED PROTECTION RELAY WITH A MODULE TO BOOST PERFORMANCE

RELATED APPLICATION

This application claims priority as a continuation application under 35 U.S.C. § 120 to PCT/IB2013/001791, which was filed as an International Application on 19 Aug. 2013 designating the U.S., and which claims priority to Indian Applications 5044/CHE/2012 filed in India on 4 Dec. 2012, and 1464/CHE/2013 filed on 1 Apr. 2013. The entire contents of these applications are hereby incorporated by reference in their entireties.

FIELD

The present disclosure relates to the field of electrical power distribution. The present disclosure specifically relates to protection relays that generate a trip signal to operate a circuit breaker in case of a fault condition.

BACKGROUND INFORMATION

A protection relay, also referred as Intelligent Electronic Device (IED), is a microcontroller based intelligent electronic device with a basic function to protect electrical equipment by tripping a circuit breaker and interrupting a power line in case of abnormal situations. The tripping signal for the trip coil or other actuator of the circuit breaker can be generated by the protection relay-when a particular parameter (e.g., line or phase current) exceeds a nominal or preset value for a predefined time period.

A self-supplied (self-powered) protection relay utilizes energy from the current sensing transformers to supply to the relay electronics circuit and provide the energy required to operate trip coils. The design of a self-supplied relay has several constraints associated with it to ensure the measurements are accurate and sensitive to avoid any mal-operation. Also, special provisions are required to make its circuitry efficient and optimized for power consumption. Some of these constraints and methods to generate a power supply by controlled charging for operation of the self-powered relay are disclosed in WIPO publications WO2009101463 and WO2012056277.

A self-powered relay requires a minimum time and phase currents to get powered on. Therefore, the measurement and protection functionalities can only be performed after the self-powered relay is powered on from the energy in the circuit involving the electrical equipment being protected. In conditions where the relay is required to switch on in a fault condition (i.e., there may be a high current because of the fault), it is desirable that the self-powered relay switches on as fast as possible and also performs detection of fault conditions at the earliest time to minimize any possibility of damage due to the fault. The delay contributed by switching on of the relay and to detect fault or normal conditions to decide on tripping gets reflected as a Switch On To Fault (SOTF) time which is a parameter used to evaluate speed of a protection system.

A state of the art protection relay working on microcontrollers with 75 MHZ operating frequency as an example is likely to consume around 50 milliseconds for the activities mainly involving power stabilization (powering up using the line current), power on reset delays (initialization) and non-volatile memory read operations. The controller electronics (base module) starts executing the protection algorithm only after around 50 milliseconds from the instant device is powered on. This duration is a crucial period for SOTF time.

A protection system with a lower SOTF time is expected to operate faster and is safer. The startup time of the processing device (e.g., microcontroller) used in self-powered relays is a major contributing factor to SOTF time. The startup includes time to initialize (boot) and the time to execute the protection algorithm used for the purpose of computing normal/abnormal condition. A reliable and less complex algorithm is certainly preferred to have the SOTF time and reliability within acceptable limits.

Further, the trip signal from a self-powered relay is provided with help of a trip capacitor that provides the power required to drive the coil. Therefore, in a self-powered relay, a fast trip capacitor charging circuit to have faster SOTF is desired and the charging method to be developed should consider challenges in a self-power device.

SUMMARY

A protection relay is disclosed which is configured to measure a current in a power line via at least one current sensor for providing electrical protection by generating a trip signal to operate a circuit breaker connected in the power line, the protection relay comprising: a first module for analyzing measured current in a power line and for providing electrical protection by generating a first trip signal based on the analyzed measured current by the first module; a second module for analyzing the measured current in the power line and for providing electrical protection by generating a second trip signal based on the analyzed measured current by the second module; and a power management unit for providing power to the first module and the second module by controlled charging of a bus capacitor from the measured current, and performing controlled charging of a trip capacitor from the bus capacitor; wherein, the trip signal to operate the circuit breaker connected in the power line is generated by logical combination of the first trip signal from the first module and the second trip signal from the second module.

BRIEF DESCRIPTION OF THE DRAWINGS

Other features and advantages will become apparent to those skilled in the art upon reading the description of preferred exemplary embodiments in conjunction with the accompanying drawings, wherein.

DETAILED DESCRIPTION

Exemplary embodiments of a relay are disclosed herein wherein the time to Switch On to Fault (SOTF) can be reduced (e.g., minimized). In one aspect, a protection relay is provided. The protection relay has a base module, also referred to as a first module having of all the functionality required for operation of the relay and in addition, one or more specialized modules, being referred to as additional modules, to boost performance. For SOTF enhancement in a self-powered protection relay (i.e., to reduce the time for SOTF specially in a self-powered protection relay, the additional module (referred as SOTF core or second module) can include power and time efficient circuitries to execute measurement and protection related tasks efficiently.

In an exemplary embodiment, the trip signal for the circuit breaker is generated based on the trip signal from the first module and the trip signal from the additional module. The trip signal from the first module and the trip signal from the additional module in an embodiment may be logically combined with an "OR" logic to produce the trip signal from the protection relay for the circuit breaker. From the view of reducing SOTF, the trip signal from the additional module is produced with efficient processing using as an example, Field Programmable Gate Array (FPGA) modules to have power and time efficient means to carry out processing. The additional module (second module) performs tasks related to decision for generating trip signal much faster than that by the first module. The decision for generating trip signal can be made on the basis of comparing the magnitude of measured current and magnitude of harmonics content in at least one specific frequency with a preconfigured values in the relay based on its settings. The trip signal can result also from other algorithms used for determining the conditions for trip.

In yet another exemplary embodiment, the additional module can include a programmable device such as a microcontroller or a microprocessor based circuits or application specific integrated circuit (ASIC) or programmable logic device (PLD).

In yet another exemplary embodiment, the additional module can include analog circuits of analog filters and comparators.

In yet another exemplary embodiment, the additional module can include digital circuits.

In yet another exemplary embodiment, the additional module configured for having faster SOTF value is used only during the Power ON of the protection relay. The additional module may be electronically isolated after the first module is fully functional and operative after the Power ON of the protection relay.

In yet another exemplary embodiment, one or more additional modules are used along with the first module and the one or more additional modules are programmatically isolated or connected to work together with the first module to carry out any function related to measurement and analysis of power parameters (e.g., current, voltage, frequency etc.) or to carry out functions related to configuration, diagnostics or human machine interface (HMI) functions.

In another aspect disclosed herein, a protection relay includes a power management unit that is configured to provide power to various modules of the protection relay including a first module and a second module by controlled charging of a bus capacitor from the current which the protection relay is measuring. The power management unit also performs electronic isolation of the bus capacitor during measurement of the current so that the measurements are accurate.

In another exemplary embodiment, the protection relay includes a power management unit that performs controlled charging of a trip capacitor from the bus capacitor. Also the controlled charging of the trip capacitor includes electronic isolation of the trip capacitor from the bus capacitor during the trip signal generation to operate the circuit breaker connected in the line.

In yet another exemplary embodiment, the controlled charging of the trip capacitor is made such that sufficient energy is available by fast charging to operate the circuit breaker before the generation of the trip signal to operate the circuit breaker. This can ensure that SOTF time is reduced (e.g., minimized) not just by having efficient computation means but also minimized time for charging a trip capacitor responsible for providing energy during trip operation.

Figure 1:
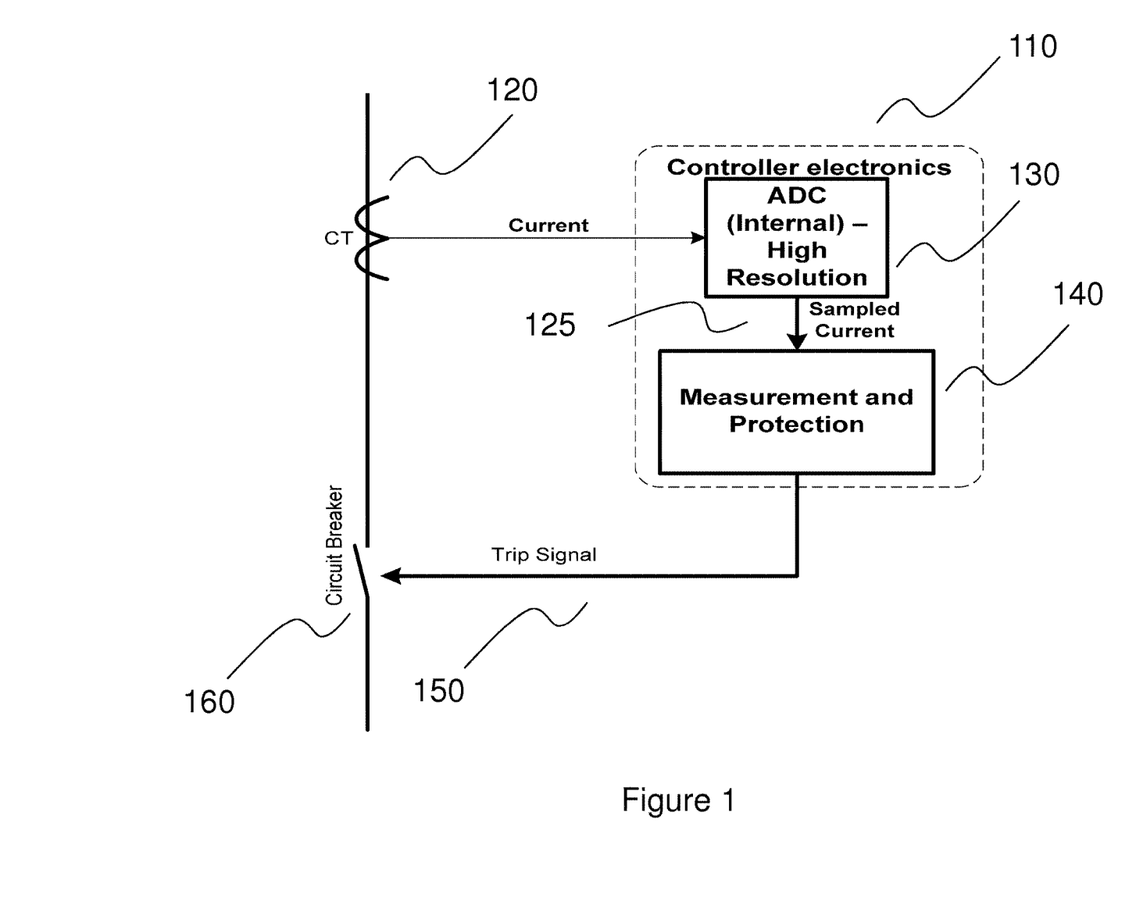
FIG. 1 is a block diagram of an exemplary protection system having a protection relay.

FIG. 1 shows a basic block diagram of an exemplary protection system with a protection relay connected for protection. The self-powered relay has measurement and protection algorithms executed using a controller electronics 110. The controller electronics 110, also referred as base module senses the current using a current sensor (current transformer) 120, samples and digitizes the current signal 125 using analog to digital convertor (ADC) 130 and performs computation on the sampled digital data with a measurement and protection component 140 to decide whether or not to serve the trip command 150 for circuit breaker 160. The current signal 125 is also used to generate power for the relay (not shown in FIG. 1) in case of a self-powered protection relay. Further, the figure is described using current as an example of the electrical parameter being measured but it can be noted that a relay (IED) can be used for measurement or/and protection purpose involving measurement and analysis of multiple electrical parameters (current, voltage, frequency etc).

The SOTF time contribution by the base module in a self-powered relay may be visualized with respect to self-powering activity within the self-powered relay to reach a stable power for itself. The voltage build up happens with the measured current signal and on reaching a specific voltage level (trigger voltage level) from the powering ON the relay, the power management and system critical tasks are performed, including initialization of electronics in the self-powered relay. As the voltage further builds up and reaches power-up stage where sufficiently stable voltage is available for the system devices, a power on reset signal is provided to the base module. Subsequently the base module gets initialized and performs read cycles involving external nonvolatile memory. On successful initialization the base module executes the tasks to detect the fault and serve trip command at SOTF time.

SOTF time may be minimized if there is an efficient way to have the computing device to initialize (boot) and execute the protection algorithm used for the purpose of computing normal/abnormal condition immediately at the power-up stage. This is realized for a self-powered relay by providing a parallel specialized circuit for fast booting and efficient execution of protection algorithm to minimize the SOTF time. The specialized circuit being parallel should be efficient also for power consumption. Further, the parallel specialized circuit may be designed to be specialized only to execute critical task, here, in this case SOTF task and would not have the burden of any general purpose or system activities that the base module used in self-powered relay is required to carry out.

Figure 2:
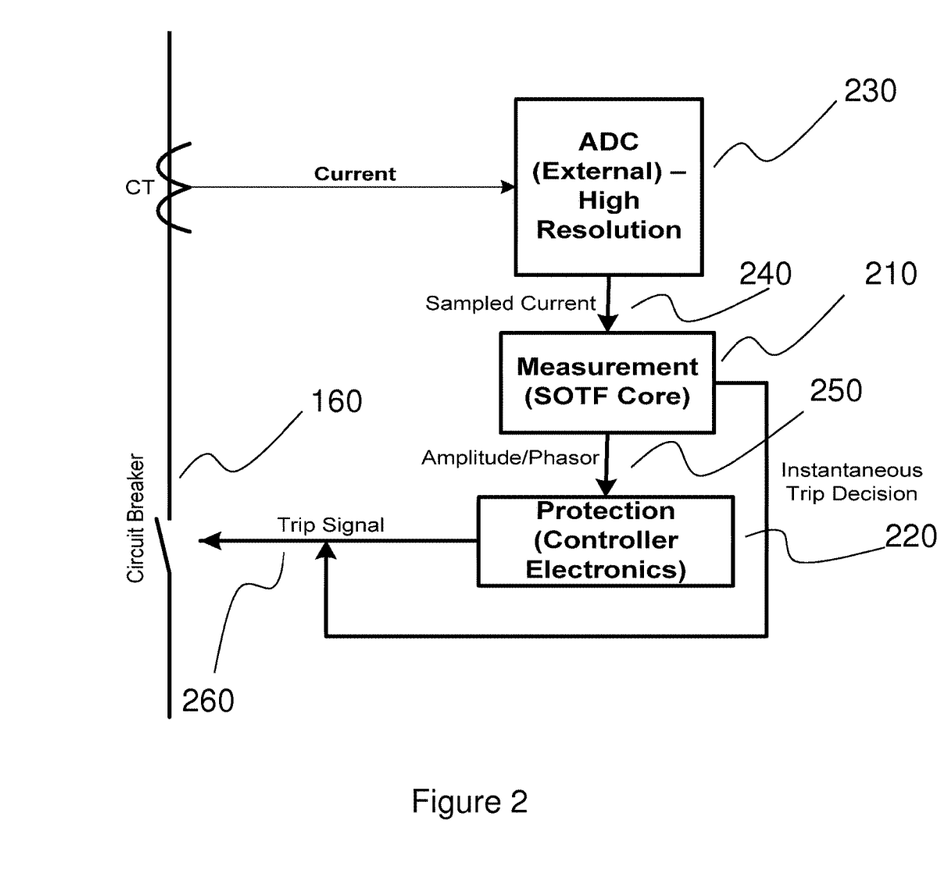
FIG. 2 is a block diagram of an exemplary protection system having a protection relay with SOTF core.

FIG. 2 shows a block diagram illustrating the working of an exemplary embodiment. A specialized circuit, 210 for parallel execution of protection algorithm, hence after referred as SOTF core or additional module or second module, is connected to a controller electronics (base module or first module) 220. The SOTF core, 210 is interfaced with an ADC that may be either external to both the SOTF core and controller electronics (base module) or may be integral part of the SOTF core. In the embodiment shown in FIG. 2, ADC, 230 is shown to be external to both. The SOTF core performs processing of digitized current signal (sampled current), 240 and also shares information (digitized current signal and processed information), 250 with the controller electronics (base module). The architecture has the benefit of off-loading portion of computational burden from controller electronics (base module), 220 to the SOTF core, 210. The SOTF core in addition processes digitized analog values to make a trip decision. The SOTF core may process at least two full power cycles (50/60 Hz) to make a trip decision. The trip signal 260 to the circuit breaker 160 is provided by combining the trip signal from the SOTF core 210 and the trip signal from the controller electronics (base module) 220 by a Boolean "OR" function. The SOTF core may process two power cycle data for reliable detection of fault condition.

As SOTF core is a specialized circuit, the processing by SOTF core may end even before the controller electronics (base module) starts executing the protection algorithm. If the trip command is not served by SOTF core the base module has the power cycle data used by the SOTF core ready for it to further work with protection algorithm, which may be advantageous for fast and efficient processing by the base module.

Figure 3:
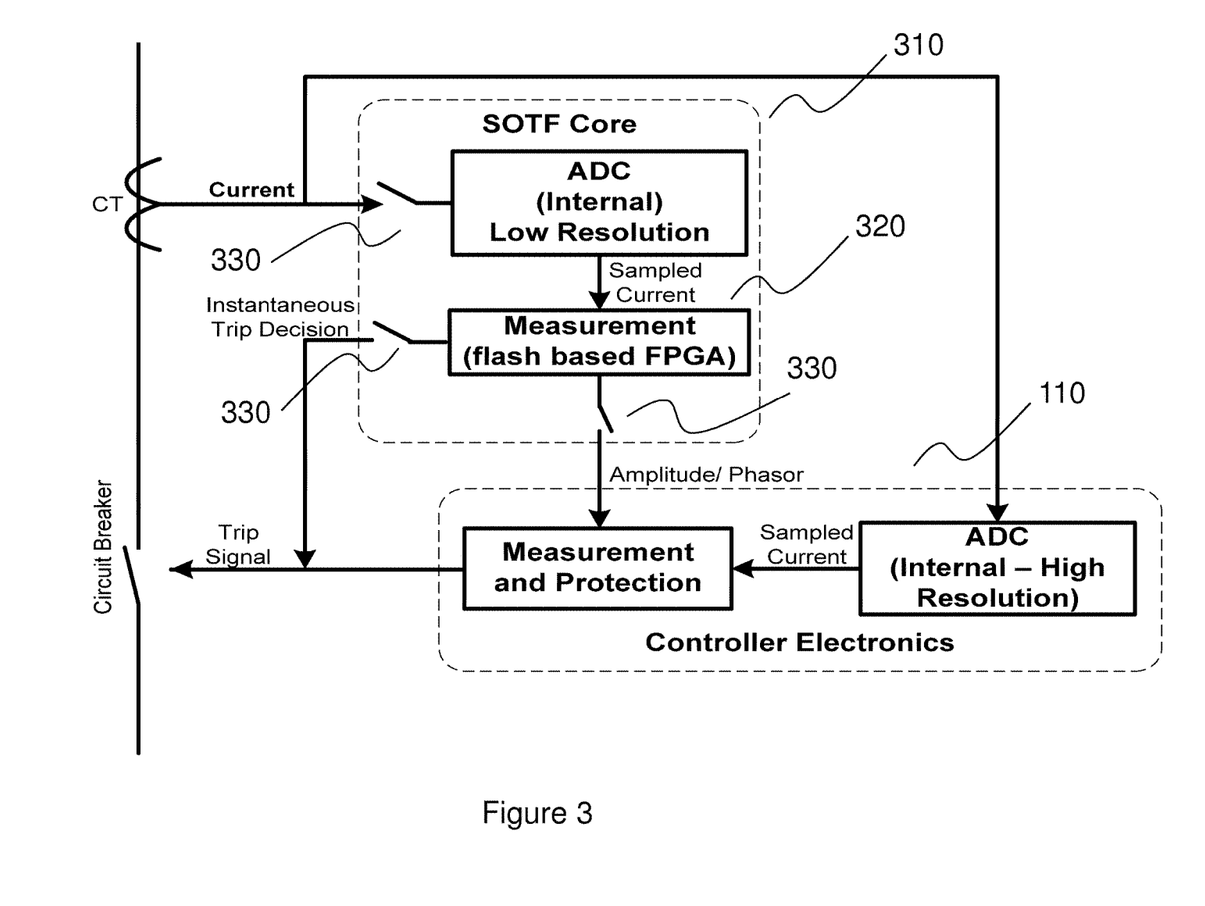
FIG. 3 is a block diagram of an exemplary protection system having a protection relay with FPGA based SOTF core.

FIG. 3 illustrates another exemplary embodiment where a SOTF core 310 includes (e.g., consists of) ADC and FPGA, 320 used for measurement and fault detection. Further, there is a provision to electronically isolate the SOTF core with switches 330 once the microcontroller is up and running. In this embodiment, FPGA 320 is made use for fast parallel execution of measurement and processing algorithms to have significant SOTF time reduction. The processing of digitized current signal may be performed to estimate the values of current magnitude along with its harmonics. These values are compared with pre-configured threshold values to determine existence of fault condition. The measurement of current signal, though in the embodiment is shown for a single phase, is also configurable for measurement of multiple phases.

In other exemplary embodiments, the SOTF core (additional module) may be implemented based on general purpose programmable devices (microcontroller) or custom made programmable devices such as application specific integrated circuit (ASIC) or programmable logic device (PLD).

In another exemplary embodiment, the SOTF core may be implemented using analog circuitries or digital or mixed (analog and digital) circuitries without any programmable devices (micro controller, FPGA, ASIC etc) based on electronic (analog/digital) manipulation of current signal to determine signal magnitude including magnitude of harmonics at select frequencies and detect fault condition for trip using comparators.

In the exemplary embodiment illustrated in FIG. 3, as the SOTF core electronically is capable to isolate itself, there is no off-loading of any further computational burden after power ON. The base module will have to do all its functionalities related to measurement and protection. The benefits of electronic isolation may be to reduce power consumption during normal operation as SOTF core need not be powered after the SOTF time duration and the saved power may be used for other functions/peripherals during the normal functioning of the self-powered relay.

In another exemplary embodiment, the SOTF core may be optionally isolated or optionally connected with the base module (i.e., at any time), when additional parallel computation may be required for example to process signals with different algorithms to improve confidence on measurement or determination of fault, SOTF core may be optionally connected and initiated accordingly to assist base module with parallel processing.

Figure 4:
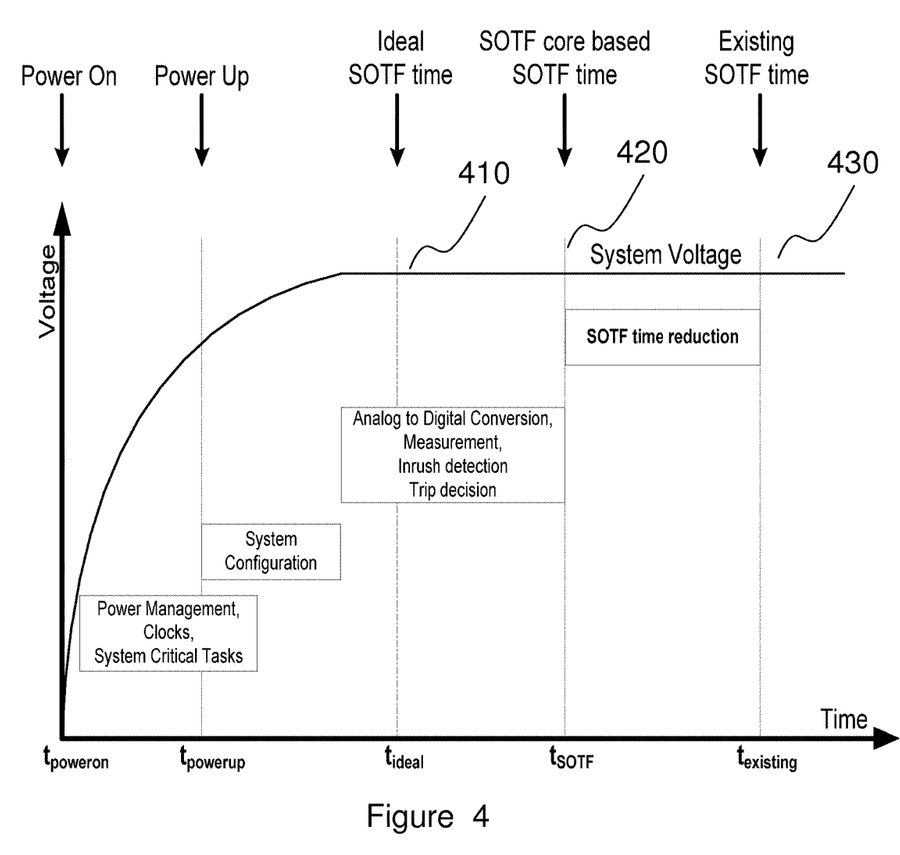
FIG. 4 illustrates various exemplary stages in powering up and execution of tasks for a self-powered relay with a SOTF core.

The various exemplary stages in powering up and execution of tasks for a self-powered relay with a SOTF core is illustrated in FIG. 4. The SOTF time contribution with SOTF core is minimized as the SOTF core may begin its processing (digital or analog) on reaching a sufficiently stable voltage, 410. The SOTF core being designed as a special circuitry has just the primary task of fault detection with minimal system burden that is completed sooner (420) in comparison with the time for completion of task (430) for fault detection on Power ON by a controller electronics (base module). If any trip decision is arrived at, the trip signal is issued much earlier, at 420 than that with controller electronics (base module), at 430. Thus the provision with SOTF core provides significant SOTF time reduction.

Figure 5:
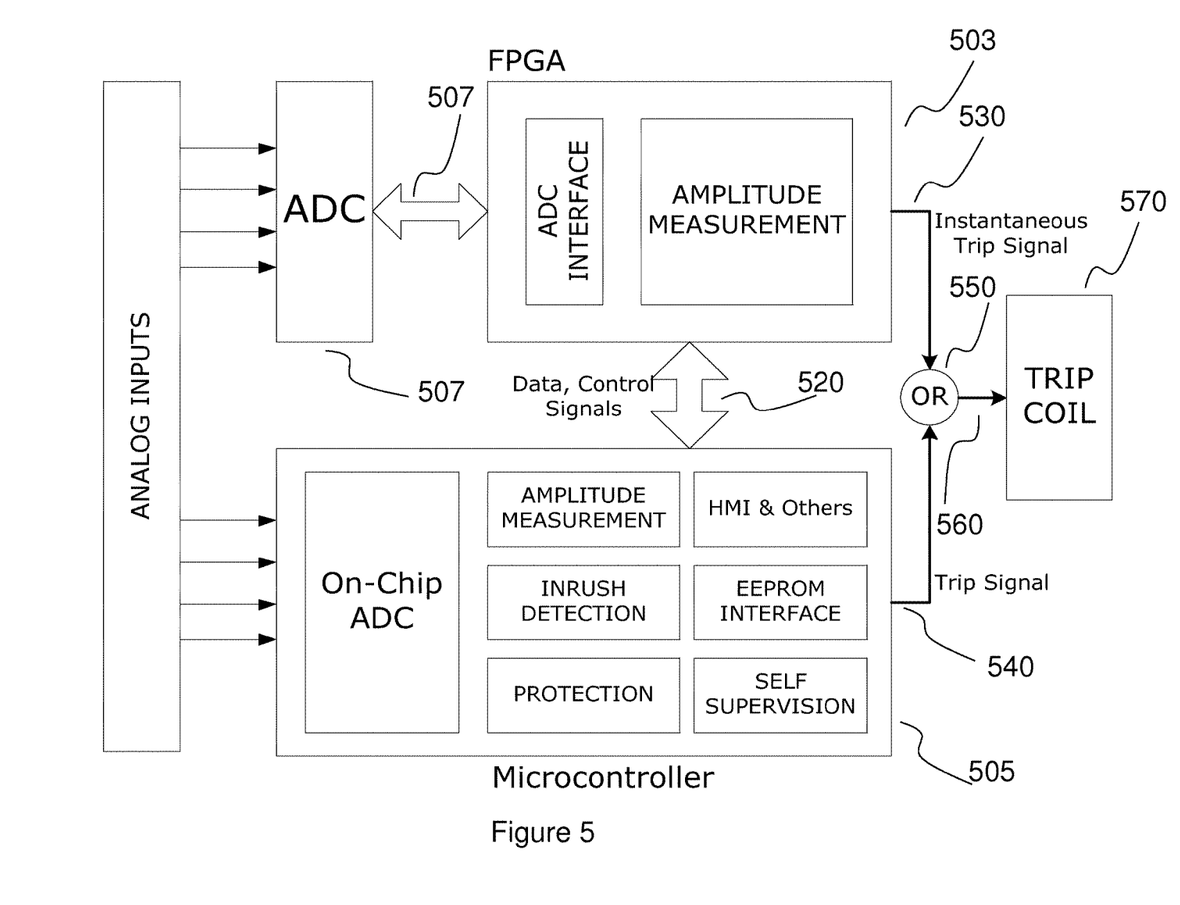
FIG. 5 is a block diagram of an exemplary self-powered relay with a FPGA SOTF core.

FIG. 5 shows architecture of an exemplary self-powered relay with a FPGA SOTF core, 503 along with controller electronics (base module), 505. The controller electronics (base module) is depicted as a microcontroller in the figure. The SOTF core is interfaced with an ADC, 507 with data and control signal interface 510, The FPGA SOTF core also has data and control signal interface, 520 with the microcontroller based controller electronics (base module). The FPGA SOTF core performs measurement and processing for faster trip decision. The trip signal, 530, from the FPGA SOTF core, referred as instantaneous trip signal is combined using Boolean OR (550) with the trip signal 540 generated from the controller electronics (base module), 505 to have the combined trip signal 560 for a trip coil 570. The SOTF performs minimal critical tasks to minimize the SOTF time while the controller performs in addition performs tasks like, Human Machine Interface (HMI) interface, supervision etc.

As another exemplary embodiment, two or more specialized circuits (additional modules) along with the base module to carry out specialized activity related with any function that a relay may perform, for example functions related to measurement or protection or configuration or diagnostics or HMI. The base module or any other circuitry (e.g., power management circuitry) in the relay may accordingly initialize the specialized circuits. The specialized circuitries may be hosted or organized within a single module (e.g., within the FPGA SOTF core) or may have additional modules interfaced with base module. It may be noted that the self-powered relay may be designed as combinations of specialized circuitry that are organized and managed to improve performance or power management for effective operation of the self-powered relay.

To achieve successful and fast tripping during minimum SOTF condition, sufficient energy should be available as soon as possible once current starts flows through the sensing current transformer (CT). This energy is stored in a capacitor, known as trip capacitor. Fast charging of trip capacitor should not affect functioning of other circuit of the protection relay as the protection relay is fully self-powered from the current such that powering does not affect the working of microcontroller, accuracy of current measurement or detection of fault conditions. Therefore the charging needs to be controlled for the rate of charging and also the manner this charging is scheduled with respect to powering or measurement/analysis function carried out by the relay. Thus, in a self-powered relay, hardware design can be optimized for startup time for performance and power consumption which requires tight coupling between the hardware/software functionalities with power management scheme.

To achieve fast charging of a trip capacitor in a self-power protection device, exemplary embodiments take in account the startup current (i.e., to power on the self-powered device) which needs to be minimum, and energy demand for the fast charging trip capacitor that should be controlled such that it is within the available minimum energy budget. The trip capacitor is to be isolated from the bus voltage (main voltage) during trip to prevent any rebooting of the protection device during tripping and the circuit design should satisfy thermal withstand requirement (20 kA for 3 sec, 25 kA for 1 sec, 62.5 kA for half power cycle).

Figure 6:
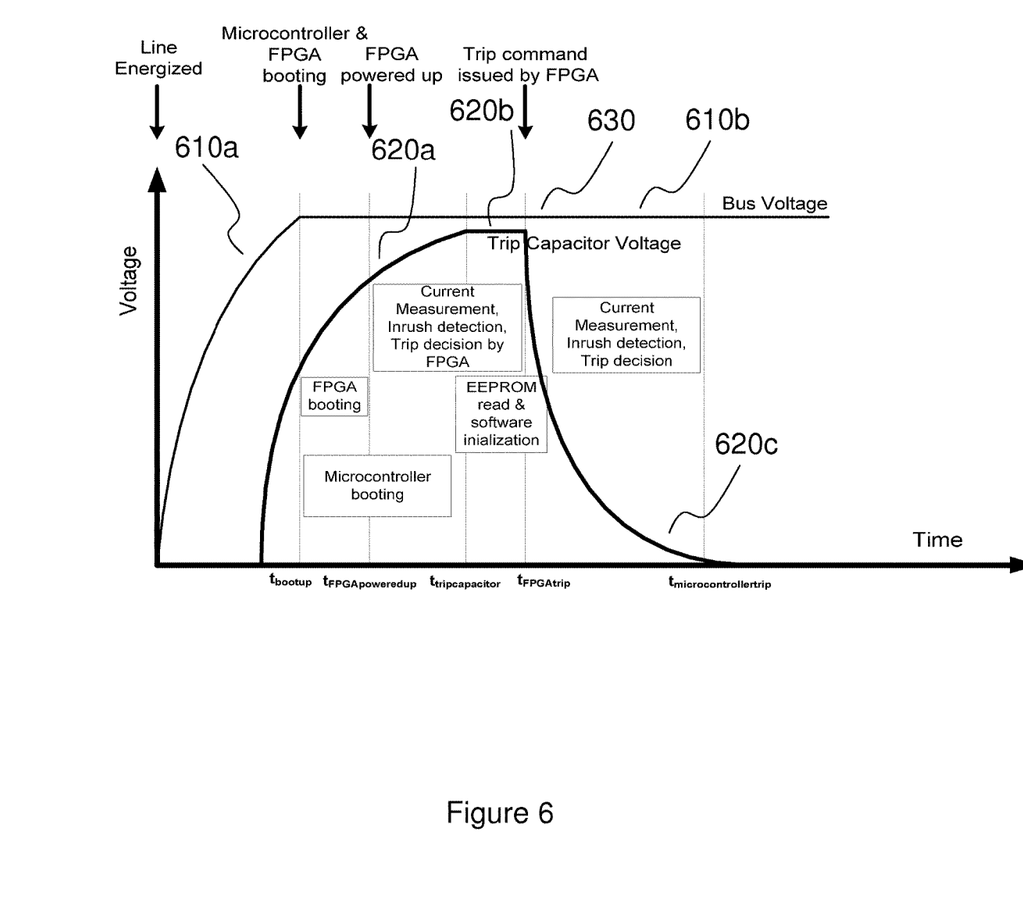
FIG. 6 illustrates exemplary controlled charging of bus capacitor and trip capacitor sequenced with operation of a self-powered relay.
Figure 7:
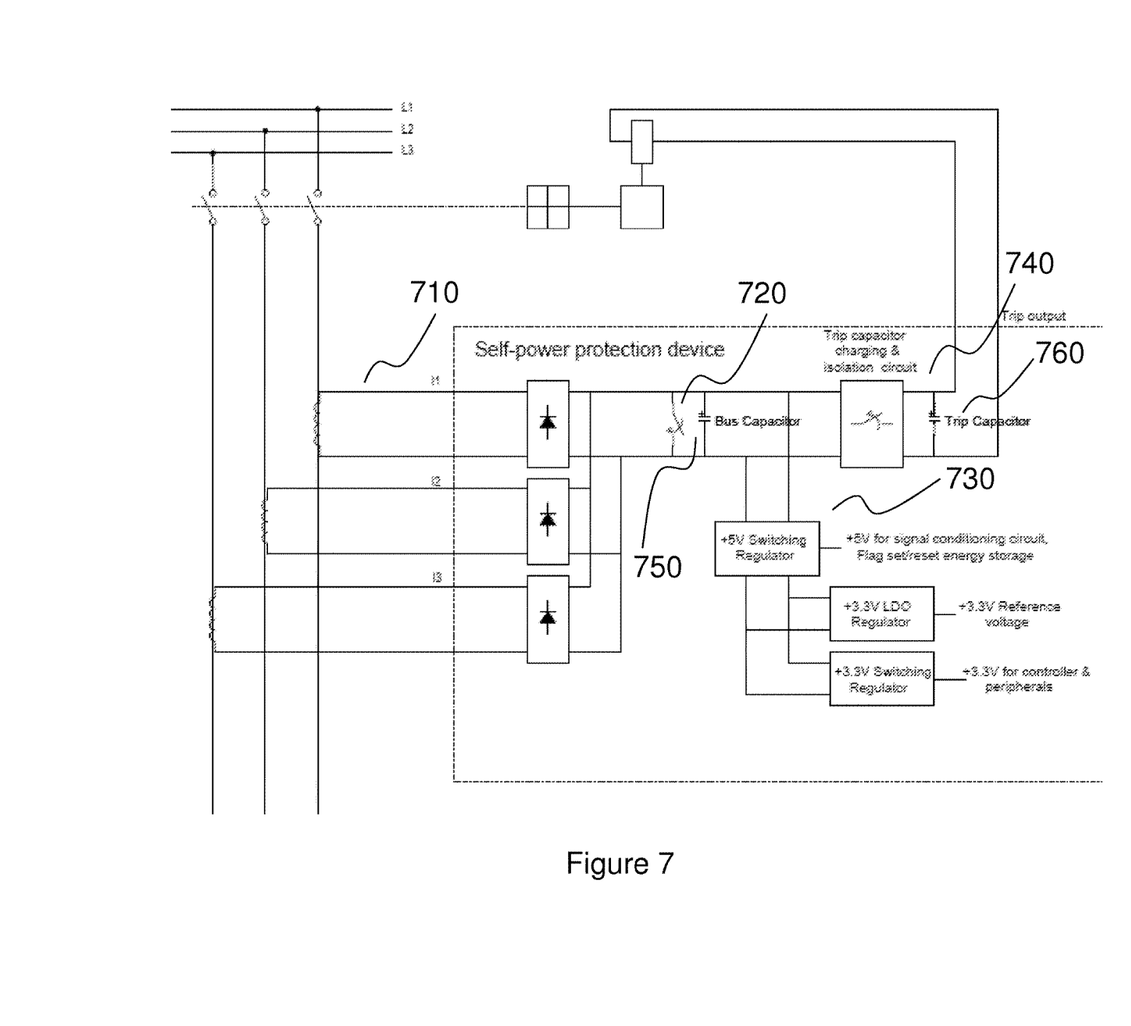
FIG. 7 illustrates exemplary power extraction and management in a self-powered relay.

FIG. 6 shows exemplary sequencing of hardware/software functionalities with respect to the charging of a bus capacitor (bus voltage) and trip capacitor and an exemplary power management scheme is illustrated in FIG. 7. The protection relay can include a power management unit to manage power for various modules including operations related to bus capacitor and trip capacitor. In FIG. 7, the bus voltage (610) is established by charging of bus capacitor (610a) in a controlled manner to the bus voltage through one or more current sensors (710). In FIG. 7, a switch 720 represents control of bus capacitor charging. The bus voltage is regulated for various powering needs in the self-powered relay through regulators represented by 730 in FIG. 7. The microcontroller and FPGA power up is initiated as soon as sufficient power is available with the bus capacitor to maintain the bus voltage through controlled charging. As discussed earlier, the FPGA SOTF core gets ready to process the current and determine fault conditions much before the microcontroller. The trip capacitor is also charged through the bus capacitor, controlled through trip capacitor charging and isolation circuit 740 illustrated in FIG. 7 through the charging profile 620a to stabilize at 620b to make available energy for trip if a fault is detected during the startup of the relay. In an event of the fault, the FPGA SOFT generates a trip signal at the instance illustrated by 630 and the energy from the trip capacitor voltage is made use by discharge 620c. The power management is carried out to have an exemplary SOTF around 40 ms by fast charging of the trip capacitor without restarting/rebooting of the relay or any other effect on performance of the self-power relay.

Figure 8:
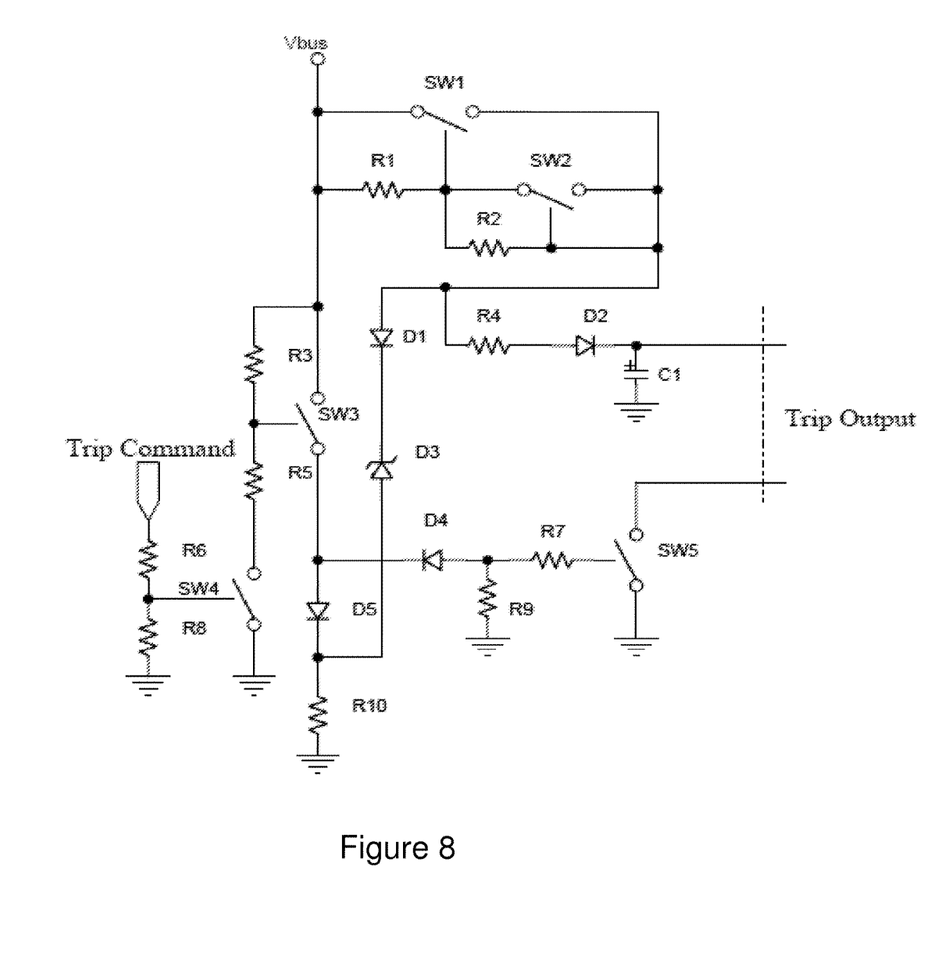
FIG. 8 is an exemplary scheme to charge and discharge a trip capacitor in a self-powered relay.

FIG. 8 provides a scheme to charge the trip capacitor after powering ON the self-powered relay. The figure shows all switches SW1-SW5 with a generic switch symbol. In an exemplary embodiment, each SW1-SW3 can be realized with a PNP transistor, SW4 can be a NPN transistor and SW5 can be MOSFET. The functioning of the scheme is explained through mention of the electronic components as referenced in FIG. 8.

In this scheme, charging of trip capacitor gets started when Vbus exceeds breakdown voltage of D3. Charging current of trip capacitor C1 is limited by current limiting resistor R4 and charging time will be decided by the time constant of R4 & C1. In this scheme, the capacitor is exponentially charged. During the trip condition, trip capacitor C1 is isolated from Vbus by switches SW1 & SW2.

Charging of Trip Capacitor:

When the relay is energized with CT input, the energy is stored in bus capacitor (Vbus) to supply power to the relay.

Charging of trip capacitor starts as Vbus exceeds breakdown voltage of zener diode D3. Now, biasing current of SW2 start flowing through path Vbus→R1→R2→D1→D3→R10→Ground. So, SW2 is turned ON.

Once SW2 is turned ON, SW1 will get the biasing current (which is DC gain of SW2 times biasing current of SW2) and it will turn on and start charging of trip capacitor C1 through Vbus→SW1→R4→D2→C1→Ground. Series resistor is R4 is kept to limit the charging current. Diode D2 is kept in series path to avoid discharging of trip capacitor through the charging circuit.

Discharging of Trip Capacitor:

As the relay detects the fault, trip is command issued by the controller.

Trip command will turn on SW4. As SW4 is turned on, switch SW3 will get biasing through path Vbus→R3→R5→SW4→Ground and it will be turned on.

Once SW3 is turned on zener diode D3 will be forward biased through path Vbus→SW3→D5→D3. Now, SW2 will not get biasing current and stops conducting which in turn will stop biasing of SW1. Hence, SW1 is turned off and trip capacitor is disconnected from the Vbus.

At the same instant, SW5 will get biasing through Vbus→SW3→D4 (zener diode)→R9→Ground. And trip capacitor is discharged through path C1→Trip output→SW5→Ground.

Other means for charging of trip capacitor are possible, for example by adjusting biasing of SW1 & SW2 without series current limiting resistor R4. This will cause an effect of linear charging. Another exemplary means for charging of trip capacitor can be by adjusting biasing of SW1 & SW2 as well SW1 current limiting resistor R1. This will cause an effect of linear charging up to certain voltage and then exponential charging of trip capacitor.

Thus, fast charging of trip capacitor within power budget is achieved to support trip operation on detection of a fault during initialization of the base module of the self-powered relay.

While only certain features of the invention have been illustrated and described herein, many modifications and changes will occur to those skilled in the art. Various illustrations in the invention is made with specific exemplary conditions related to a self-powered relay and these conditions may equally be applicable for a protection relay that has a dedicated power source. Further, examples for over current protection with measurement of current are also applicable for over voltage protection with measurement of line voltage or for other power parameters for which a relay or an IED may be used.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A protection relay configured to measure a current in a power line via at least one current sensor for providing electrical protection by generating a trip signal to operate a circuit breaker connected in the power line, the protection relay comprising:
   a first module comprising a microcontroller for digitizing the measured current signal to provide a first digitized current signal, for analyzing the first digitized current signal, and for providing electrical protection by generating a first trip signal based on the analyzed first digitized current signal;
   an analog to digital converter (ADC) for digitizing the current to provide a second digitized current signal;
   a second module for analyzing the second digitized current signal obtained from the ADC and for providing electrical protection by generating a second trip signal based on the analyzed second digitized current signal; and
   a power management unit for providing power to the first module and the second module by controlled charging of a bus capacitor from the measured current and for performing controlled charging of a trip capacitor from the bus capacitor;
   wherein the protection relay generates the trip signal to operate the circuit breaker connected in the power line by logical combination of the first trip signal from the first module and the second trip signal from the second module and wherein the second module is configured for optionally connecting or isolating with the first module.

2. The protection relay as described in claim 1, wherein the controlled charging of the bus capacitor includes isolating the bus capacitor during measurement of current using the at least one current sensor.

3. The protection relay as described in claim 1, wherein the controlled charging of the trip capacitor includes isolating the trip capacitor from the bus capacitor during operation of the circuit breaker.

4. The protection relay as described in claim 3, wherein the trip capacitor is configured to be charged to an energy capacity sufficiently capable to operate the circuit breaker before generation of a trip signal to operate the circuit breaker.

5. The protection relay as described in claim 1, wherein the second module comprises:
   a circuit to perform analysis based on comparing a magnitude of the measured current and a magnitude of at least one harmonic frequency in the measured current with a pre-configured value.

6. The protection relay as described in claim 1, wherein the second module is a Field Programmable Gate Array (FPGA) module.

7. The protection relay as described in claim 1, wherein the second module is a programmable device including a microcontroller or microprocessor based circuitry.

8. The protection relay as described in claim 1, wherein the second module is configured to perform analyses of the second digitized current signal for providing electrical protection by generation of the second trip signal faster than the first module is configured to perform analyses of the first digitized current signal for providing electrical protection by generation of the first trip signal.

9. The protection relay as described in claim 1, wherein the second module is configured for analyzing the second digitized current signal and for providing electrical protection by generation of the second trip signal during Power ON of the protection relay.

10. The protection relay as described in claim 1, wherein the second module is capable of being electronically isolated with switches from the first module after the first module is functionally operative.

11. The protection relay as described in claim 1, wherein the second module is programmatically isolated or connected to work together with the first module to measure or analyze power parameters in a power line or perform configuration, diagnostics or human machine interface (HMI) functions.

* * * * *